US00RE43086E

(19) United States
(12) Reissued Patent
Hsu et al.

(10) Patent Number: US RE43,086 E
(45) Date of Reissued Patent: Jan. 10, 2012

(54) METHOD AND USER INTERFACE FOR PERFORMING A SCAN OPERATION FOR A SCANNER COUPLED TO A COMPUTER SYSTEM

(75) Inventors: Chuan-Yu Hsu, Hsinchu (TW); Jay Liu, Hsinchu (TW); T. J. Hsu, Hsinchu (TW)

(73) Assignee: Transpacific Systems, LLC, Wilmington, DE (US)

(21) Appl. No.: 11/237,579

(22) Filed: Sep. 27, 2005

Related U.S. Patent Documents

Reissue of:
(64) Patent No.: 6,628,416
Issued: Sep. 30, 2003
Appl. No.: 09/417,985
Filed: Oct. 13, 1999

(51) Int. Cl.
*G06K 15/00* (2006.01)
*H04N 1/00* (2006.01)
*G06K 9/00* (2006.01)
*G06K 9/34* (2006.01)

(52) U.S. Cl. ..... 358/1.15; 382/167; 382/176

(58) Field of Classification Search ..... 358/1.15, 358/442, 444, 473, 1.6, 1.1, 474; 382/167, 382/176
See application file for complete search history.

(56) References Cited

U.S. PATENT DOCUMENTS 5,826,035 A * 10/1998 Hamada et al. ..... 709/247
5,974,173 A * 10/1999 Kimura ..... 382/167
5,996,029 A * 11/1999 Sugiyama et al. ..... 710/15
6,137,591 A * 10/2000 Kikinis ..... 358/1.6
6,370,277 B1 4/2002 Borrey et al.
6,480,304 B1 11/2002 Os et al.
6,751,780 B1 6/2004 Neff et al.
2002/0012453 A1* 1/2002 Hashimoto et al. ..... 382/112

* cited by examiner

*Primary Examiner* — Jerome Grant, II
(74) *Attorney, Agent, or Firm* — Stolowitz Ford Cowger LLP

(57) ABSTRACT

A method and user interface is provided for use on a computer system coupled with a scanner for performing a scan operation on an original document, which allows the user to acquire scanned images in an easier and more user-friendly manner. The method allows the user to scan an original document without requiring the user to have [learned knowledge] *a* background in the science of image processing, and also allows the scanner to perform only one scan operation on the original document. These features allow the use of the scanner to be easier and more user-friendly than the prior art. [By the, method, the first step is to determine] *In the method, first a scanner driver program suited for optimizing the scan of the original document determines* a set of image processing settings [by a scanner driving program that are suited for optimal scan of the original document; and then]. *Then* the scanner is activated to perform a scan operation on the original document based on the image processing settings to thereby obtain a primitive scanned image. Next, an image-enhancement process is performed on the primitive scanned image to thereby obtain a quality-enhanced image; and finally, the quality-enhanced image is transferred to the application program for use by [the] *an* application program.

25 Claims, 3 Drawing Sheets

METHOD AND USER INTERFACE FOR PERFORMING A SCAN OPERATION FOR A SCANNER COUPLED TO A COMPUTER SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to scanner technology, and more particularly, to a method and user interface for performing a scan operation for a scanner coupled to a computer system, which allows the user to acquire scanned images in an easier and more user-friendly manner.

2. Description of Related Art

A scanner allows a user to convert the printed matter on a document into a digital image for further processing by a computer. In the use of a scanner, however, it requires well-learned and highly-experienced users to do the image processing tasks properly. For inexperienced users, it usually requires a long period to learn, typically in a trial-and-error manner, which would make the training quite cost-ineffective since additional electricity and paper cost may be required in the training course.

The U.S. Pat. No. 4,837,635 discloses a method that allows the user to acquire a scanned image by first obtaining a primitive scanned image from the scanner, and then specify suited image processing settings such as size and scan area for the scanner to perform a second scan operation on the original document to thereby obtain a final scanned image. By this method, the final scanned image can approach closely to the image qualities of the original document. One drawback to this patent, however, is that it is quite inefficient to use since it requires the scanner to perform two scan operations on the same document.

FIG. 1 is a flow diagram showing the procedural steps involved in a conventional method to obtain a scanned image from an original document.

In the first step P100, the user interface for the scanner is activated. In the next step P102, the user interface commands the scanner to perform a primitive scan operation on the original document. The primitive scanned image is then displayed by the user interface for the user to make enhancements thereon.

In the next step P104, the user interface asks the user to specify suited image processing settings for the enhancement of the primitive scanned image, such as size setting and the desired scan area of the original document.

In the next step P106, the user interface activates the scanner to perform a second scan operation on the original document based on the image processing settings to thereby obtain a final scanned image. In the next step P108, the final scanned image is transferred to an application program for use by the application program.

It is apparent that the foregoing procedure has the drawback of requiring the scanner to perform two scan operations on the same document to obtain the final scanned image, which makes the image acquisition quite inefficient.

Moreover, the U.S. Pat. No. 4,837,635 is still [quire] *quite* insufficient in functionality to meet user demands in image processing.

In the use of many conventional image scan programs, it requires the user to have [learned knowledge] *a* background in the science of image processing. [Therefore, for unlearned and inexperienced users, it would be highly difficult for them to use these programs rightly, and requires the user to spend much time and material on training.] *Consequently, inexperienced users have a difficult time using the programs correctly without spending time, and other resources, on obtaining the proper training.*

In summary, conventional user interfaces for scanner operation have the following drawbacks.

First, they require the user to have [learned knowledge] *a* background in the science of image processing in order to properly carry out the image acquisition, which makes the use of the scanner quite difficult and user-unfriendly.

Second, if a user has no such knowledge background, the user needs to spend much time and material on training, typically in a trial-and-error manner, which would make the use of the scanner quite cost-ineffective.

Third, the U.S. Pat. No. 4,837,635 provides only limited functionality to the image processing, which would not meet user demands in high-end image processing.

Fourth, the prior art requires the scanner to perform two scan operations on the same document to acquire the final scanned image to be used by the application program, which makes the use of the scanner quite inefficient. It is desired that only one scan operation is needed.

SUMMARY OF THE INVENTION

It is therefore an objective of this invention to provide a method and user interface for use on a computer system coupled with a scanner for performing a scan operation, which allows the user to operate the scanner in an easy and user-friendly manner.

It is therefore an objective of this invention to provide a method and user interface for use on a computer system coupled with a scanner for performing a scan operation, which allows the scanner to perform only one scan operation on the original document.

In accordance with the foregoing and other objectives, the invention proposes a new method and user interface for use on a computer system coupled with a scanner for performing a scan operation.

Fundamentally, the invention allows the user to scan an original document without requiring the user to have learned knowledge background in the science of image processing, and also allows the scanner to perform only one scan operation on the original document. These features allow the use of the scanner to be easier and more user-friendly than the prior art.

The invention is designed for use with a user interface incorporated in a computer system coupled with a scanner for performing an automatic scan operation on an original document. The computer system runs a scanner driver and an application program. The scanner driver is used to drive the scanner, and the application program can process the scanned image as an image file.

The method of the invention includes the following procedural steps: (1) determining a set of image processing settings by a scanner driving program that are suited for optimal scan of the original document; (2) activating the scanner to perform a scan operation on the original document based on the image processing settings to thereby obtain a primitive scanned image which is then transferred to the scanner driver; (3) activating the scanner driver to perform an image-enhancement process on the primitive scanned image to thereby obtain a quality-enhanced image; and (4) transferring the quality-enhanced image to the application program for use by the application program.

In the foregoing method, the image-enhancement process includes a comprehensive set of image processing routines, such as automatic cutting, distortion correction, color calibration, and automatic character recognition. The quality-enhanced image is then transferred to the scanner driver in the computer system, and then transferred via the scanner driver to the application program specified by the user through the user interface. The application program can be either an image editing program or a word processor that can accept the quality-enhanced image as an image file.

By the invention, the scanner needs just to perform one scan operation on the original document rather than two scan operations required by the prior art (the U.S. Pat. No. 4,837,635). The invention is therefore more efficient than the prior art. After this, the invention will automatically perform an image-enhancement process on the primitive scanned image to thereby obtain the quality-enhanced image, without requiring the user to have learned knowledge background in the science of image processing in order to perform the image enhancement, and therefore no training is required. Since the user needs not to spend time and material on learning the operation of the scanner, it makes the use of the scanner more cost-effective and user-friendly. Furthermore, the invention provides an image-enhancement process that includes a comprehensive set of image processing routines which would meets most user's demands in image processing.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
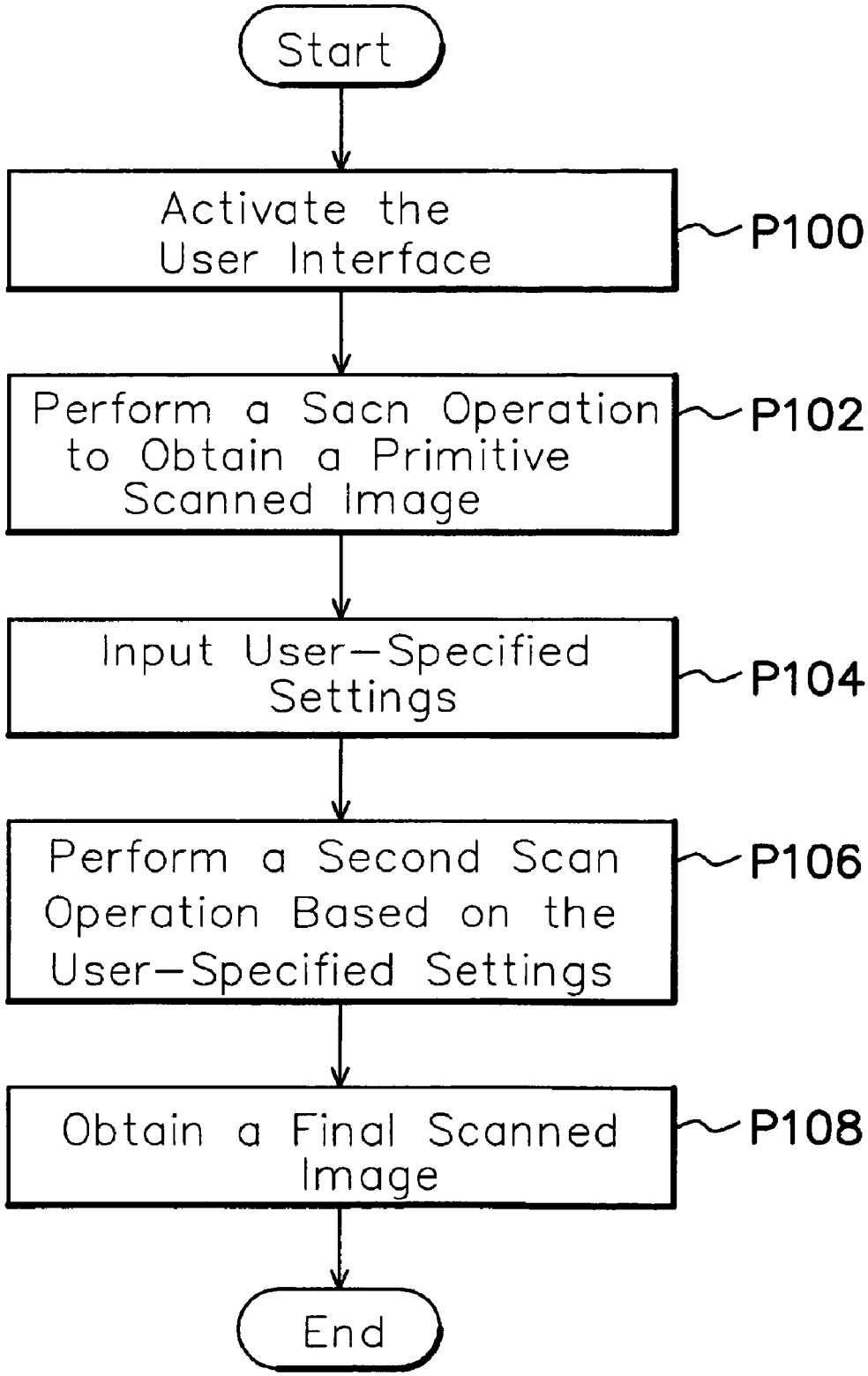
FIG. 1 (PRIOR ART)
FIG. 1 (PRIOR ART) is a flow diagram showing the procedural steps involved in a conventional method to obtain a scanned image from an original document.
Figure 2:
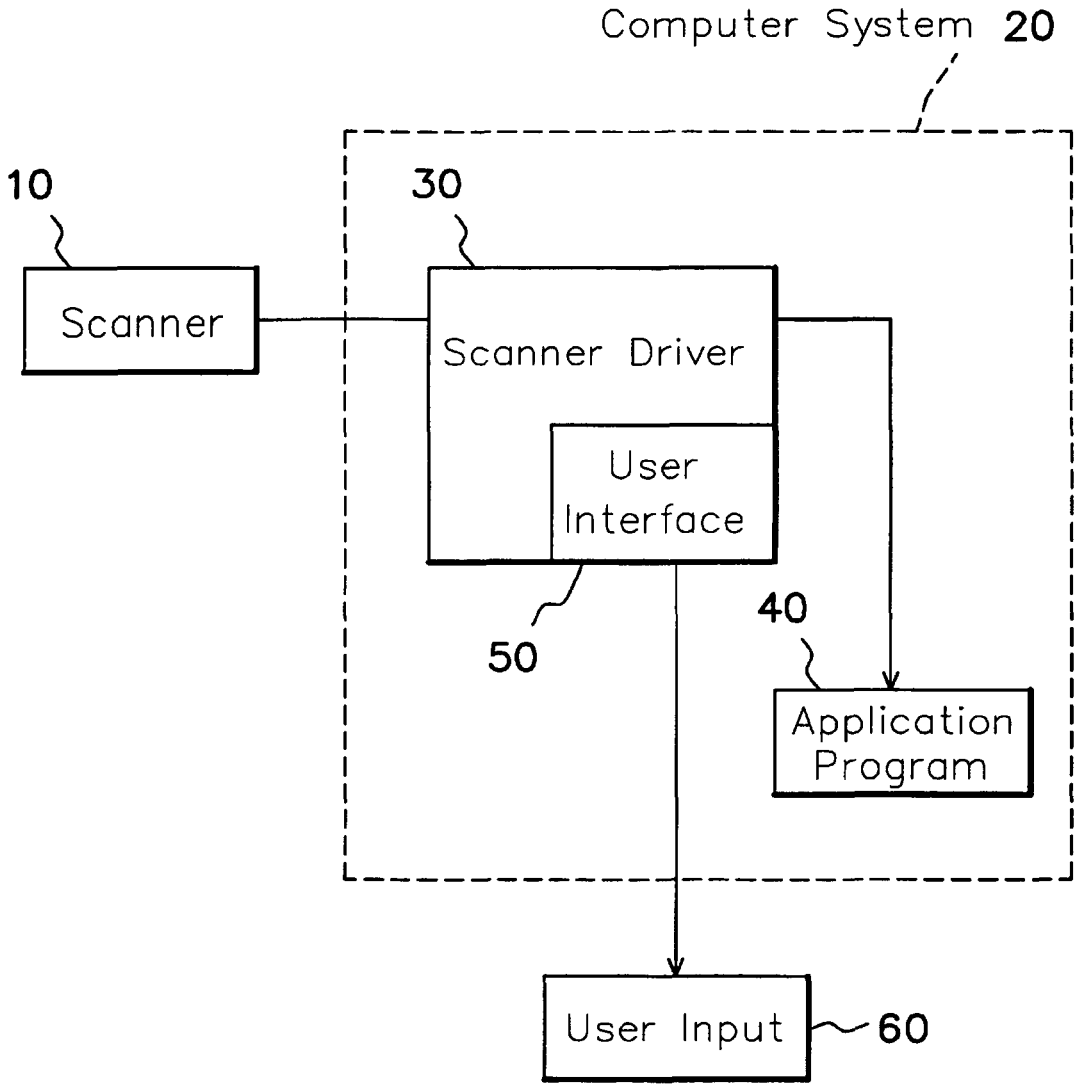
FIG. 2 is a schematic block diagram of the incorporation of the user interface of the invention in a computer system coupled with a scanner.

FIG. 2 is a schematic block diagram of the incorporation of the user interface of the invention, as the block designated by the reference numeral 50, in a computer system 20 coupled with a scanner 10. The computer system 20 runs a scanner driver 30, which is a software program, for driving the scanner 10. Further, the computer system 20 runs an application program 40 which can process the scanned image from the scanner 10 as an image file. The block designated by the reference numeral 60 is used to represent the input from user operation. The user can specify a set of proper image processing settings into the user interface 50.

When the user wants to acquire a scanned image from an original document (not shown), the user first needs to place the original document (not shown) on the scanner 10, and then specify a set of image processing settings that are suited for optimal scan of the original document (not shown). Next, the user interface 50 activates the scanner 10 to perform a scan operation on the original document (not shown) based on the image processing settings in the user interface 50 to thereby obtain a primitive scanned image. The primitive scanned image is then transferred to the scanner driver 30 in the computer system 20.

Next, the scanner driver 30 performs an image-enhancement process on the primitive scanned image to thereby obtain a quality-enhanced image. The image-enhancement process includes a comprehensive set of image processing routines, including automatic cutting, distortion correction, color calibration, and automatic character recognition.

After this, the scanner driver 30 checks whether there is still another document waiting to be scanned. If YES, the scanner driver 30 will perform another scan operation. The quality-enhanced image is then transferred to the application program 40 for use by the application program 40.

Figure 3:
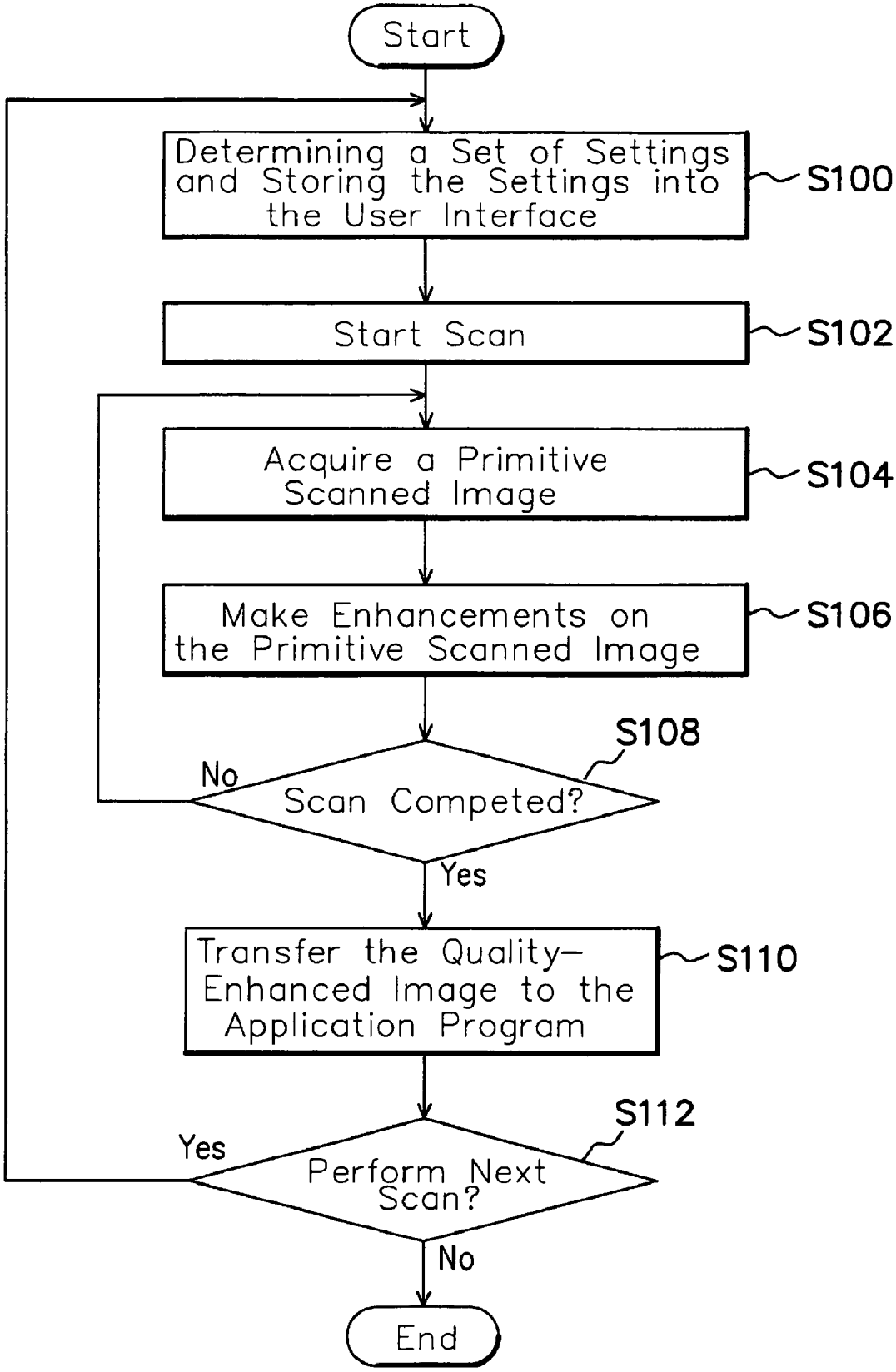
FIG. 3 is a flow diagram showing the procedural steps involved in the method of the invention for performing a scan operation on an original document.

FIG. 3 is a flow diagram showing the procedural steps involved in the method of the invention for performing a scan operation on the original document. This method is used with the computer system 20 and the scanner 10 shown in FIG. 2 and is performed by the user interface 50.

In the first step S100, a set of image processing settings that are suited for optimal scan of the original document is determined by a scanner driving program, and then stores these settings into the user interface 50.

In the next step S102, the user interface 50 issues a scan request to the scanner 10. In response, in the next step S104, the scanner 10 is activated to perform a scan operation on the original document based on the image processing settings in the user interface 50 to thereby obtain a primitive scanned image. The primitive scanned image is then transferred to the scanner driver 30.

In the next step S106, the scanner driver 30 is activated to perform an image-enhancement process on the primitive scanned image to thereby obtain a quality-enhanced image. The image-enhancement process includes a comprehensive set of image processing routines, including automatic cutting, distortion correction, color calibration, and automatic character recognition.

In the next step S108, the user interface 50 checks whether there is still another document waiting to be scanned. If YES, the procedure returns to the step S104; otherwise, the procedure goes to the step S110.

In the step S110, the quality-enhanced image [resulted] *resulting* from the image-enhancement process is transferred to the application program 40 for use by the application program 40. The application program 40 can be either an image editing program or a word processor that can accept the quality-enhanced image as an image file.

In the next step S112, the user interface 50 displays a message asking whether the user wants to scan another document. If the user responds with YES, the procedure returns to the step S100; otherwise, the procedure is ended.

In conclusion, the invention has the following advantages over the prior art.

First, it requires the scanner to perform only one scan operation on the original document rather than two scan operations required by the prior art (the U.S. Pat. No. 4,837,635). The invention is therefore more efficient to use than the prior art.

Second, the invention allows the image-enhancement process to be entirely carried out automatically without requiring the user to have knowledge background in the science of image processing, so that the use of the scanner is easier and more user-friendly.

Third, since the invention allows the user to carry out the scan operation without having to spend time and material on training, the use of the scanner is more cost-effective than the prior art.

Fourth, the invention provides an image-enhancement process that includes a comprehensive set of image processing routines which would meet most user's demands in image processing.

Fifth, the invention allows the image acquisition to be mostly performed automatically, allowing the operation of the scanner to be more simplified and user-friendly.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method implemented on a user interface incorporated in a computer system coupled with a scanner for performing a scan operation on an original document, the computer system running a scanner driver and an application program[;], the method comprising the steps of:

determining a set of image processing settings required for the original document by a scanner driving program;

obtaining a primitive scanned image in a manner that the scanner uses *the* image processing settings through the scanner driving program;

performing an image-enhancement process on the primitive scanned image, wherein the image-enhancement process includes an automatic cutting routine; and obtaining a final image by the image-enhancement process, wherein the final image is transferred to the application program.

2. A method implemented on a user interface incorporated in a computer system coupled with a scanner for performing a scan operation on an original document, the computer system running a scanner driver and an application program[;], the method comprising the steps of:

determining a set of image processing settings required for the original document by a scanner driving program;

obtaining a primitive scanned image in a manner that the scanner uses *the* image processing settings through the scanner driving program;

performing an image-enhancement[.] process on the primitive scanned image, wherein the image-enhancement process includes a distortion correction routine; and obtaining a final image by the image-enhancement process, wherein the final image is transferred to the application program.

3. A method implemented on a user interface incorporated in a computer system coupled with a scanner for performing a scan operation on an original document, the computer system running a scanner driver and an application program[;], the method comprising the steps of:

determining a set of image processing settings required for the original document by a scanner driving program;

obtaining a primitive scanned image in a manner that the scanner uses *the* image processing settings through the scanner driving program;

performing an image-enhancement process on the primitive scanned image, wherein the image-enhancement process includes a color calibration routine; and obtaining a final image by the image-enhancement process, wherein the final image is transferred to the application program.

4. A method implemented on a user interface incorporated in a computer system coupled with a scanner for performing a scan operation on an original document, the computer system running a scanner driver and an application program[;], the method comprising the steps of:

determining a set of image processing settings required for the original document by a scanner driving program;

obtaining a primitive scanned image in a manner that the scanner uses *the* image processing settings through the scanner driving program;

performing an image-enhancement process on the primitive scanned image, wherein the image-enhancement process includes an automatic character recognition routine; and obtaining a final image by the image-enhancement process, wherein the final image is transferred to the application program.

5. A user interface for a scanner, comprising:

[a] *the* scanner, for scanning an original document to [an] image data;

a computer system, for storing and processing the image data from the scanner;

a scanner driving program, for driving the scanner and then performing an image-enhancement process on the image data stored in the computer system; *and* an application program, for receiving a final image processed by the image-enhancement process, wherein a method implemented on the user interface [comprising] *comprises* the steps of:

determining a set of image processing settings required for the original document by [a] *the* scanner driving program;

obtaining a primitive scanned image in a manner that the scanner uses *the* image processing settings through the scanner driving program;

performing an image-enhancement process on the primitive scanned image, wherein the image-enhancement process includes an automatic cutting routine; and obtaining [a] *the* final image by the image-enhancement process *on the primitive scanned image,* wherein the final image is transferred to the application program.

6. A user interface for a scanner, comprising:

[a] *the* scanner, for scanning an original document to [an] image data;

a computer system, for storing and processing the image data from the scanner;

a scanner driving program, for driving the scanner and then performing an image-enhancement process on the image data stored in the computer system; *and* an application program, for receiving a final image processed by the image-enhancement process, wherein a method implemented on the user interface [comprising] *comprises* the steps of:

determining a set of image processing settings required for the original document by [a] *the* scanner driving program;

obtaining a primitive scanned image in a manner that the scanner uses *the* image processing settings through the scanner driving program;

performing an image-enhancement process on the primitive scanned image, wherein the image-enhancement process includes a distortion correction routine; and obtaining [a] *the* final image by the image-enhancement process *on the primitive scanned image,* wherein the final image is transferred to the application program.

7. A user interface for a scanner, comprising:

[a] *the* scanner, for scanning an original document to [an] image data;

a computer system, for storing and processing the image data from the scanner;

a scanner driving program, for driving the scanner and then performing an image-enhancement process on the image data stored in the computer system; *and* an application program, for receiving a final image processed by the image-enhancement process, wherein a method implemented on the user interface [comprising] *comprises* the steps of:

determining a set of image processing settings required for the original document by [a] *the* scanner driving program;

obtaining a primitive scanned image in a manner that the scanner uses *the* image processing settings through the scanner driving program;

performing an image-enhancement process on the primitive scanned image, wherein the image-enhancement process includes a color calibration routine; and obtaining [a] *the* final image by the image-enhancement process *on the primitive scanned image,* wherein the final image is transferred to the application program.

8. A user interface for a scanner, comprising:

[a] *the* scanner, for scanning an original document to [an] image data;

a computer system, for storing and processing the image data from the scanner;

a scanner driving program, for driving the scanner and then performing an image-enhancement process on the image data stored in the computer system; *and* an application program, for receiving a final image processed by the image-enhancement process, wherein a method implemented on the user interface [comprising] *comprises* the steps of:

determining a set of image processing settings required for the original document by [a] *the* scanner driving program;

obtaining a primitive scanned image in a manner that the scanner uses *the* image processing settings through the scanner driving program;

performing an image-enhancement process on the primitive scanned image, wherein the image-enhancement process includes an automatic character recognition routine; and obtaining [a] *the* final image by the image-enhancement process *on the primitive scanned image,* wherein the final image is transferred to the application program.

*9. A method, comprising:*

*obtaining an image processing setting for a target of a scan;*

*obtaining a primitive scanned image of the scan target using the obtained image processing setting through a scanner driving program;*

*performing an image-enhancement process on the primitive scanned image, wherein the image-enhancement process includes at least one of an automatic cutting routine, a distortion correction routine, a color calibration routine, or an automatic character recognition routine; and*

*obtaining a final image by the image-enhancement process, wherein the final image is transferred to an application program.*

*10. The method of claim 9, further comprising:*

*checking for another scan target to be scanned, the checking based on an input from a user interface;*

*if the checking indicates no additional scanning, then transferring the final image to the application program; and*

*if the checking indicates another scan target to be scanned, then causing the scanner to scan a second time before transferring the final image to the application program.*

*11. The method of claim 9, further comprising obtaining the image processing setting for the scan target based on an input from a user interface.*

*12. The method of claim 9, wherein the final image is obtained using only a single scanning of the scan target.*

*13. The method of claim 9, wherein the application program is an image editing program or a word processor.*

*14. The method of claim 9, further comprising:*

*selecting, using the scanner driving program, a subset of available image processing settings, the subset selected based on the scan target; and*

*issuing a scan request that includes at least the obtained image processing setting, wherein the obtained image processing setting is one of the settings from the subset.*

*15. A memory device having instructions stored thereon that, in response to execution by a computing device, cause the computing device to perform operations comprising:*

*obtaining a primitive scanned image using an image processing setting through a scanner driving program;*

*performing an image-enhancement process on the primitive scanned image, wherein the image-enhancement process includes at least one of an automatic cutting routine, a distortion correction routine, a color calibration routine, or an automatic character recognition routine; and*

*obtaining a final image by the image-enhancement process, wherein the final image is transferred to an application program.*

*16. The memory device of claim 15, wherein the operations further comprise:*

*checking for another scan job, the checking based on an input from a user interface;*

*if the checking indicates no additional scanning, then transferring the final image to the application program; and*

*if the checking indicates another scan job, then causing the scanner to scan a second time before transferring the final image to the application program.*

*17. The memory device of claim 15, wherein the operations further comprise obtaining the image processing setting for a scan target based on an input from a user interface.*

*18. The memory device of claim 15, wherein the final image is obtained using only a single scanning of a scan target.*

*19. The memory device of claim 15, wherein the application program is an image editing program or a word processor.*

*20. The memory device of claim 15, wherein the operations further comprise:*

*selecting, using the scanner driving program, a subset of available image processing settings, the subset selected based on a scan target; and*

*issuing a scan request that includes at least the obtained image processing setting, wherein the obtained image processing setting is one of the settings from the subset.*

*21. An apparatus, comprising:*

*means for obtaining a primitive scanned image using an image processing setting through a scanner driving program;*

*means for performing an image-enhancement process on the primitive scanned image, wherein the image-enhancement process includes at least one of an automatic cutting routine, a distortion correction routine, a color calibration routine, or an automatic character recognition routine; and*

*means for obtaining a final image by the image-enhancement process, wherein the final image is transferred to an application program.*

*22. The apparatus of claim 21, further comprising:*

*means for checking if there is another scan job; and*

*means for transferring the final image to the application program based on a result of the checking.*

*23. The apparatus of claim 21, further comprising means for determining the image processing setting based on a scan target associated with the primitive scanned image.*

*24. The apparatus of claim 21, wherein the final image is obtained using only a single scanning of a scan target.*

*25. The apparatus of claim 21, wherein the application program is an image editing program or a word processor.*

* * * * *